Jan. 13, 1925.  
B. H. HOWARD ET AL  
1,523,207  
FEEDER FOR INGOT MOLDS  
Filed Nov. 1, 1924
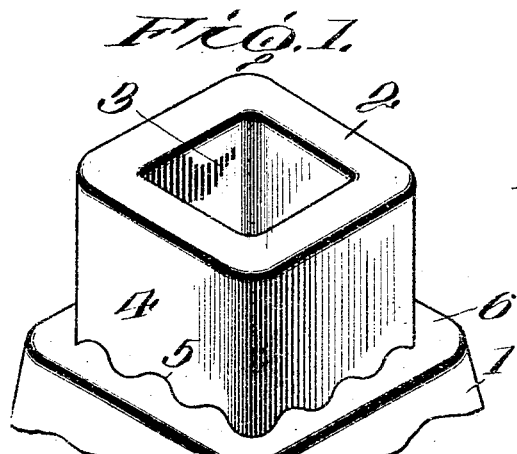
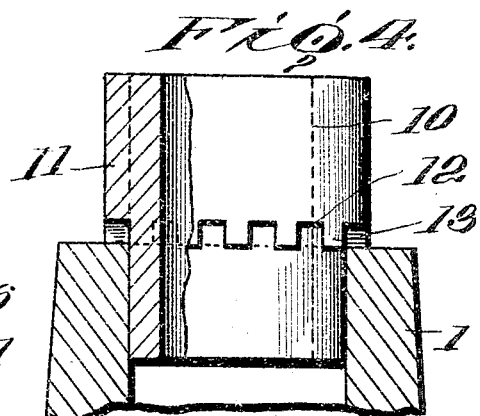
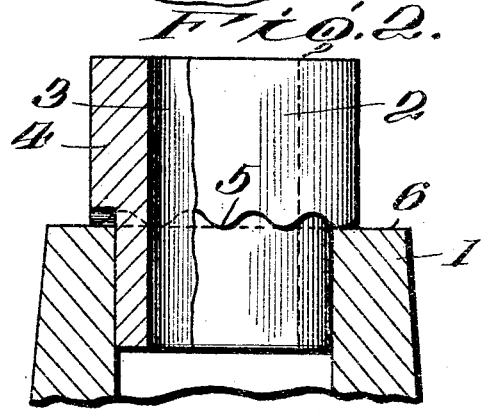
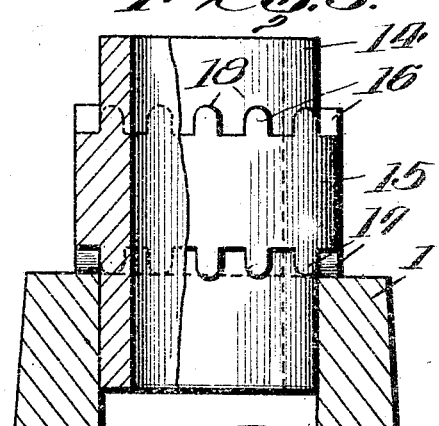
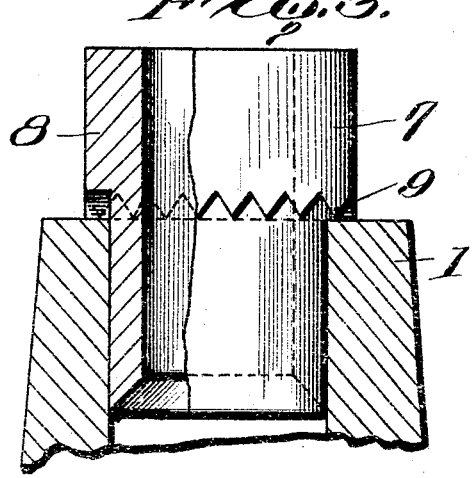
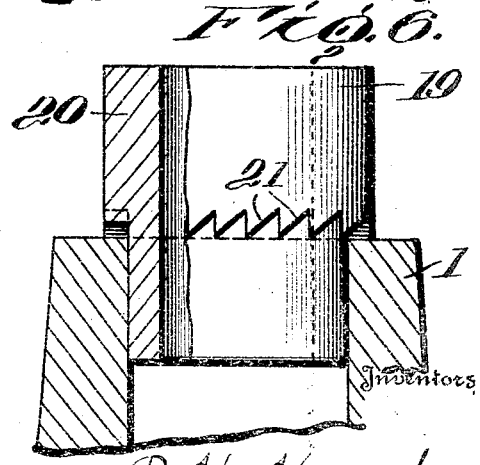
Inventors  
B. H. Howard.  
E. J. Furrer.  
By C. R. Wright Jr. Attorney Patented Jan. 13, 1925.

1,523,207

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed November 1, 1924. Serial No. 747,329.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds and has for its object to provide a feeder to prevent the formation of holes and seams in the ingots known as "piping" and also to reduce segregation to a minimum.

Another object of our invention is to provide a feeder of this character in which the proper amount of refractory material is maintained in the upper end of the feeder to retain the heat to prevent the cooling of the upper end of the mold and ingot more rapidly than the lower end and at the same time provide means whereby it is firmly and rigidly supported on the upper end of the mold with its lower end extending a predetermined distance into the mold.

A further object of our invention is to provide a feeder of this character which can be readily reversed in the mold and at the same time maintain the proper amount of refractory material above the mold to retain the heat to prevent the rapid cooling of the upper end of the mold and the ingot.

In the accompanying drawings:

Figure 1 is a perspective view of a mold showing our improved feeder applied thereto.

Figure 2 is a vertical sectional view of a mold showing the feeder partly in elevation and partly in section.

Figure 3 is a view similar to Figure 2 showing a modified form of feeder.

Figure 4 is a vertical sectional view similar to Figure 2 showing a still further modified form of feeder.

Figure 5 is a vertical sectional view of a mold showing a reversible feeder embodying our invention.

Figure 6 is a vertical sectional view of a mold showing the feeder partly in elevation and partly in section of a still further modified form of feeder.

Referring now to the drawings 1 represents the mold and 2 the feeder. The feeder 2 as shown, is provided with a bore 3 therethrough which may be of the same diameter throughout its length. The upper end of the feeder is provided with a thickened portion 4 having its lower edge corrugated as indicated at 5, this arrangement allowing the feeder to be rigidly supported upon the upper end 6 of the mold and preventing any rocking movement of the feeder on the mold.

In the modification shown in Figure 3, the feeder 7 has its thickened portion 8 provided at its lower edge with the teeth 9 which rest upon the upper edge of the mold and rigidly support the feeder on the mold.

In the modification shown in Figure 4, the feeder 10 has its thickened portion 11 provided at its lower edge with the rectangular cut out portions 12 forming the rectangular projections 13 which rest upon the upper end of the mold and rigidly support the feeder on the mold.

In the modification shown in Figure 5, the feeder 14 is provided with the thickened portion 15, intermediate its ends and the upper and lower edges of this thickened portion are provided with upwardly and downwardly extending projections 16 and 17 having their lower ends curved as indicated at 18 and whereby the feeder may be reversed in the mold and firmly supported on the upper end of the mold with either end of the feeder within the bore of the mold. While we have shown in this form, these particularly shaped supporting means or teeth, it will be understood that any of the other forms of teeth could be employed on the reversible feeder without departing from our invention.

In the modification shown in Figure 6, the feeder 19 is provided with the thickened portion 20 having at its lower edge the saw teeth 21 which rest upon the upper edge of the mold and rigidly and firmly support the feeder on the mold with its lower end within the bore of the mold.

Having thus fully described our invention what we claim is:—

1. A feeder for ingot molds comprising a body portion having a thickened portion provided at its lower end with projections regularly spaced and close together and engaging the upper end of the mold and supporting the feeder therein.

2. A feeder for ingot molds comprising a body portion having a bore therethrough, and a thickened portion having at its lower end teeth adapted to engage the upper edge of the mold and support the feeder within the mold.

3. A feeder for ingot molds comprising a body portion having a thickened portion provided with downwardly extending projections spaced equal distances apart and adapted to engage the upper edge of the mold and support the feeder within the mold.

4. A feeder for ingot molds comprising a body portion having a bore therethrough and having a thickened portion provided with regular projections arranged equal distances apart and adapted to rest upon the upper edge of the mold and supporting the feeder on the mold with a portion thereof within the bore of the mold.

5. A feeder for ingot molds comprising a body portion having a bore therethrough and having a thickened portion intermediate its ends and said thickened portion having projections at its upper and lower ends adapted to rest upon the upper edge of the mold.

6. A feeder for ingot molds comprising a body portion having a bore therethrough and having a thickened portion intermediate its ends, the upper and lower edges of said thickened portion having regularly spaced projections equal distances apart and adapted to engage the upper edge of the mold and support the same with a portion of the feeder within the bore of the mold.

In testimony whereof we affix our signatures.

BLOOMFIELD H. HOWARD.
ERNEST J. TURNER.